E. BRICKETT.
BRACE FOR HARNESS BREECHING AND BREAST PLATES.
No. 27,098. Patented Feb. 14, 1860.
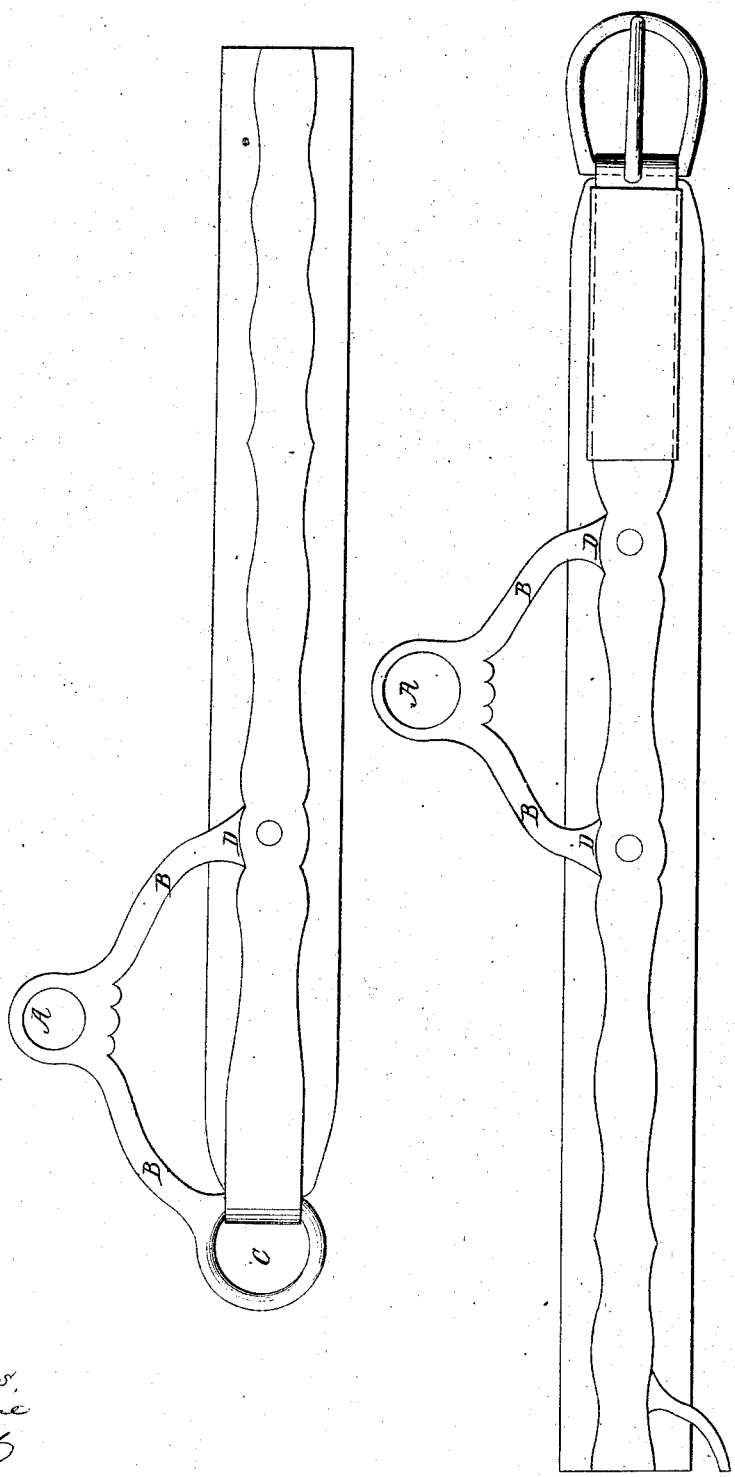

UNITED STATES PATENT OFFICE.

EDMUND BRICKETT, OF MINOT, MAINE.

BRACE FOR HARNESS BREECHING AND BREAST-PLATES.

Specification of Letters Patent No. 27,098, dated February 14, 1860.

*To all whom it may concern:*

Be it known that I, EDMUND BRICKETT, of Minot, in the county of Androscoggin, in the State of Maine, have invented a new and Improved Mode of Making Breeching and Breast-Plate Braces for Harnesses; and I do hereby declare that the following is a full and exact description thereof, reference being had to the accompanying drawings and to the letters of reference marked thereon.

The nature of my invention, consists in providing for the breeching and breast plate of harnesses, metallic braces connecting the rings and shanks with the braces. They occupy the same places in harnesses that leather braces with their requisite rings occupied by the old method of making harnesses. I make them of any shape and size to suit the harnesses they are intended for.

To distinguish my braces from the old, I make them of any metallic substance suitable for that purpose, having the requisite rings solidly connected with the braces, which are much stronger, more durable, and safer than by the old method which are made of leather, stitched into the rings and are continually wearing off, or ripping out, thereby causing many accidents to life and limb.

To enable others skilled in the art to make and use my invention, I will proceed to describe their construction.

I construct my harnesses in any of the known forms, and apply to the breeching and breast plate metallic braces, (instead of leather ones now in common use). I construct them connecting the rings and shanks with the braces, as shown by the letters A, B, C, D, in the accompanying drawings, of malleable cast iron, brass or composition, having the rings occupy the desired position, and shape the braces in any desirable form to please the taste. I japan or plate them with brass, silver, or gold, or japan or plate the rings, and cover the braces with suitable harness or patent leather. These braces when plated and applied to harnesses, add very much to their beauty, ornament and durability.

I insert the shank ends of my braces between the upper and under layers, or I place them top of both and fasten with rivets. They occupy the same places in harnesses that leather braces now do, viz. between the layers which pass around the horse's buttocks and the hip strap, that passes over his rump, and between the layers of the breast plate, which pass around the horse's breast, and the shoulder strap, that passes over his shoulders. In all other respects my harnesses are made the same as by the old method when using leather braces.

What I claim as my invention, and desire to secure by Letters Patent, is,

The application to harnesses, of metallic breeching and breast plate braces, with the rings and shanks connecting with the braces, as herein described, using for that purpose the aforesaid metallic substance, or any other metallic substance suitable for that purpose.

EDMUND BRICKETT.

Witnesses:
O. B. DURNAL,
W. C. DURNAL.